Patented Dec. 18, 1934

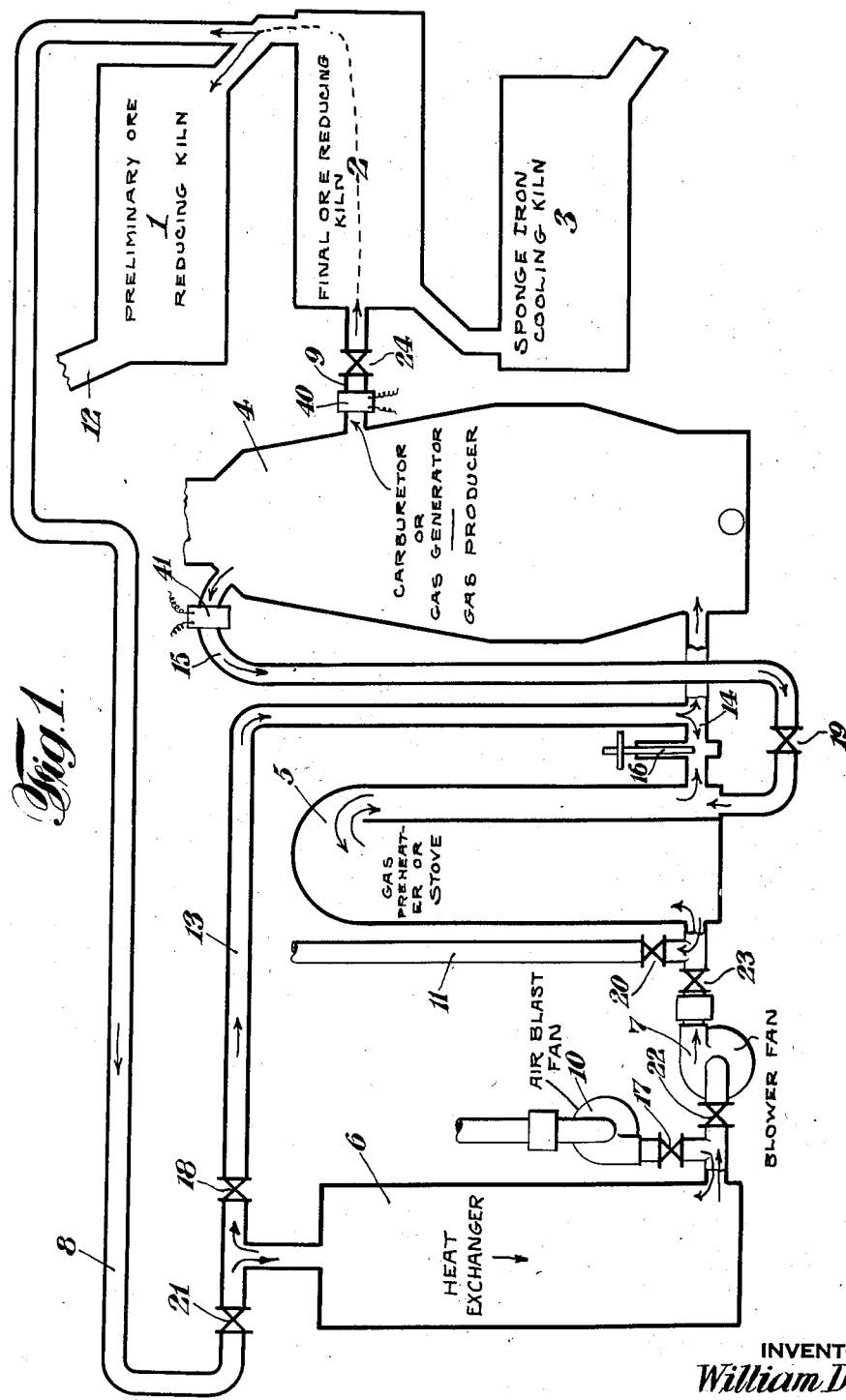

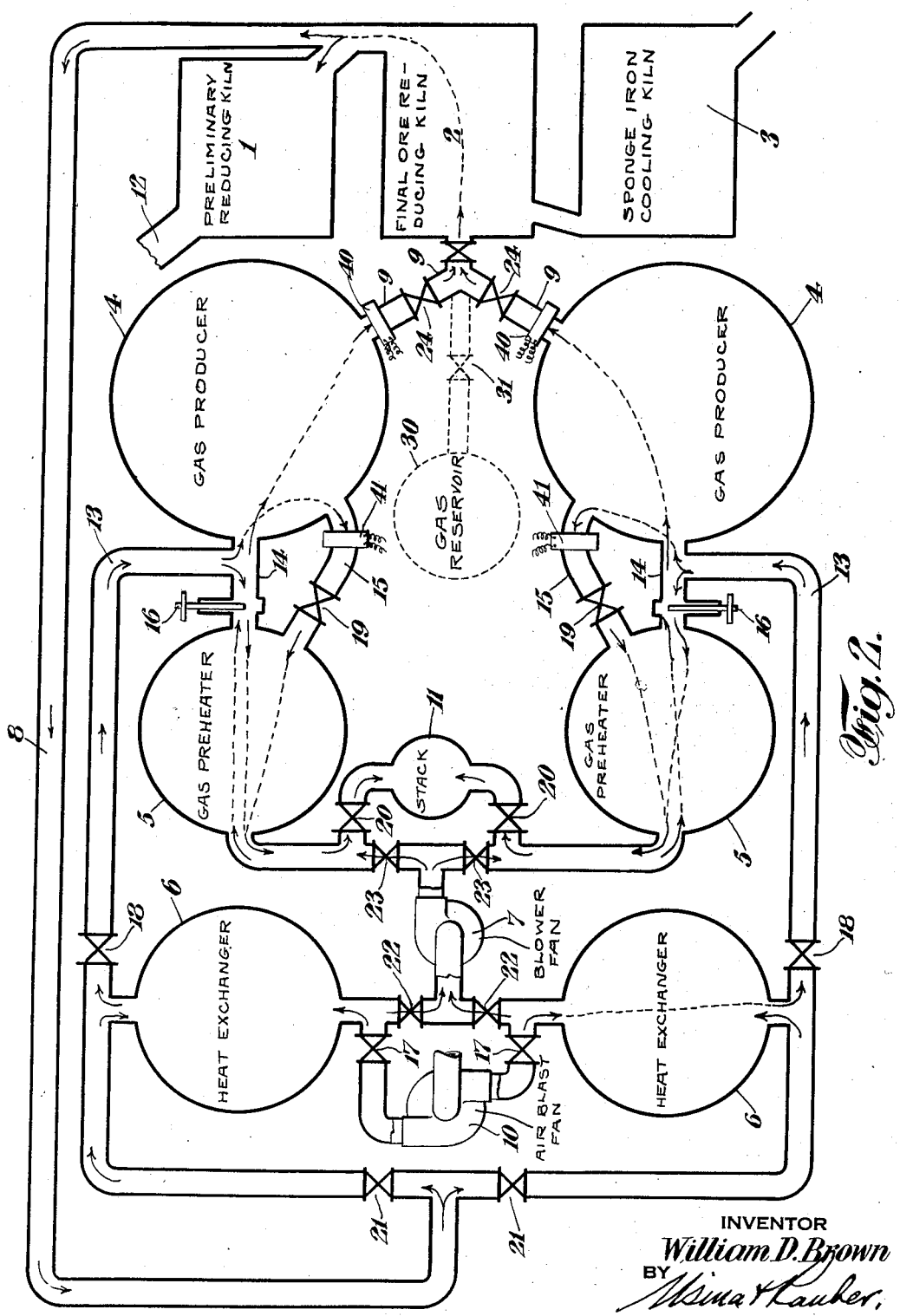

1,984,727

UNITED STATES PATENT OFFICE 1,984,727

SPONGE IRON MANUFACTURE

William Darke Brown, Pittsburgh, Pa.

Application September 29, 1931, Serial No. 565,865

3 Claims. (Cl. 75—75)

This invention relates to metallurgy and more particularly to iron metallurgy and to the manufacture of sponge iron by the reduction of iron ores with gaseous reducing agents.

Heretofore in the art it has been proposed to employ carbon monoxide (CO) as a reducing agent in the manufacture of sponge iron. The commonly employed carbon monoxide reducing gas comprises what is known in the art as producer gas. This gas is manufactured by passing air over heated carbonaceous material, such as coke, charcoal, coal, etc.

In the usual ore reducing method employed the producer gas is circulated in a free flowing stream over the ore until reduction of the iron oxide is complete. It is customary to perform the reduction in two stages. In the first stage the iron oxide in the ore is reduced by the reducing gases from $Fe_2O_3$ to $Fe_3O_4$ or to $FeO$. In the second stage the $FeO$ is reduced by the carbon monoxide to $Fe$. In the final reducing step it is found that certain conditions of gas and ore temperatures, gas composition and reducing time intervals must be maintained to obtain the maximum reducing efficiency.

The prolonged time interval of exposure of the ore to the gas requires that relatively large volumes of producer gases must be available for circulation through the reducing system. It is found also that for complete reduction the proportion of carbon dioxide ($CO_2$) which is formed as a product of reaction between the iron oxide ($FeO$) and carbon monoxide (CO), must be maintained relatively low in the reducing gas stream contacting with the lower iron oxide compounds in the final reducing step.

Heretofore attempts have been made to provide suitable gas purification or regeneration processes and apparatus, so that the efficient carbon monoxide reducing gases could be freed of the carbon dioxide content, at least to an extent to permit its return to the ore reducing system. Such methods and apparatus as have heretofore been devised to regenerate these gases have been relatively expensive to operate, and have not been commercially adaptable to provide a continuous flow of the regenerated gas. Due to the high costs of operation the application of these regenerating methods have been limited to relatively small proportions of the effluent reducing gases.

It is one of the objects of the present invention to provide an improved method of regenerating carbon monoxide reducing gases.

Another object is to provide a method of continuously regenerating carbon monoxide reducing gases.

Another object is to provide suitable gas regenerating apparatus to accomplish the same.

Still another object is to facilitate and to improve the manufacture of sponge iron by gaseous reducing agents.

Other objects and advantages will become apparent as the invention is more fully disclosed.

In accordance with the objects of the present invention I have provided an improved method of manufacturing sponge iron by the reduction of iron ores with carbon monoxide reducing gases, in which the ore reducing and the gas regenerating systems are adjusted, standardized and synchronized with each other to form a complete cycle of operations as a result of which the effluent reducing gases are continuously withdrawn from the ore reducing system, regenerated and returned in a continuous flow at a predetermined desired temperature to the ore reducing system without a substantial loss in volume, all as will be more fully hereinafter disclosed.

Before further disclosing the nature and scope of the present invention reference should be made to the accompanying drawings wherein Fig. 1 illustrates in schematic detail a simple arrangement of apparatus elements comprising the gas regeneration and sponge iron manufacturing process of the present invention; and Fig. 2 illustrates an elaboration of the same to comprise the continuous gas regeneration and ore reduction feature of the present invention.

Referring to Fig. 1 the apparatus disclosed therein comprises an ore reducing system comprising a preliminary ore reducing kiln 1, a final ore reducing kiln 2, and a sponge iron cooling kiln 3; and a carbon monoxide gas generating and regenerating system comprising a carburetor or gas generator 4, a gas preheater 5, a heat exchanger device 6, means 7 to withdraw the reducing gas through conduit 8 from the reducing system through the heat exchanger thence through preheater 5 into carburetor 4 and back into the reducing system through conduit 9; and means 10 to draw air through the heat exchanger device 6 into the carburetor 4 thence through preheater 5 to the atmosphere through stack 11. The two means 7 and 10 are alternately operated in a manner and for a purpose that will be hereinafter more fully disclosed.

In a simple description of the operation of the ore reducing system it may be stated that the iron ore is first crushed or comminuted to the desired particle size and fed by suitable means into kiln 1 at 12. Kiln 1 is preferably of the rotary type. From the preliminary reducing kiln in which the higher iron oxide compounds are reduced preferably to the lower or FeO compound, the ore passes into the final reducing kiln 2 of the same rotary type and from thence is discharged into the cooling kiln 3. The reducing gas is brought into the system at or close to the discharge outlet of the final reducing kiln 2 and passes countercurrent to the ore stream into kiln 1 and thence out through or adjacent the ore feed opening 12.

It has been found that in order to obtain an efficient rate of reduction of the FeO compounds the temperature of reduction must be maintained at approximately 1800° F. Too high an ore temperature promotes slagging and agglomeration of the ore; too high a gas temperature promotes the reversing of the reducing reaction and a decomposition of the carbon dioxide compounds to deposit deleterious amounts of carbon within the reducing ore. In order to avoid these difficulties a very precise adjustment of gas and ore temperatures and compositions must be maintained.

I have found, however, that under standardized ore reducing conditions, such as for example, standard or constant ore and reducing gas temperatures, gas volume and pressures, ore quantity, size and rate of ore movement and ore and reducing gas compositions, etc. that the amount of ore reduction during any given time interval is substantially constant. This is reflected in the amount of carbon dioxide that accumulates in the effluent gas stream from the reducing kiln. By a proper design of the reducing system the amount of carbon dioxide accumulation during any given time interval under substantially standard operation conditions can be controlled within reasonably close limits.

I propose therefore to so adjust the conditions within the reducing kiln by a proper design of apparatus and standardization of process to yield at the conclusion of the final ore reducing step a reducing gas having a predetermined known and constant carbon dioxide content. I then propose to withdraw a suitable proportion of this gas, and to regenerate the same. I propose to adjust the regenerating process so that the increase in volume obtained due to the conversion of the carbon dioxide content thereof to carbon monoxide approximately compensates for or approximately equals that proportion of the reducing gas which is not being withdrawn and regenerated. I also propose to effect the regeneration of the withdrawn gases by a nice adjustment of heat values and heat exchanges whereby regeneration of the reducing gas (or reduction of the carbon dioxide content thereof to carbon monoxide) is effected with a minimum expenditure of energy and a minimum consumption of fuel, and have adapted the same so that a continuous withdrawing, regeneration, and return of the gases to the reducing system at a predetermined desired temperature is obtained.

Referring to Fig. 1 the specific ore reducing conditions in the ore reducing system are adjusted so that a gas effluent after passing through the final reducing kiln 2 is obtained containing approximately 26% carbon dioxide of the sum of carbon dioxide and carbon monoxide. The effluent gas is at approximately atmospheric pressure but at a temperature approximating 1800° F. and flows at a rate approximating at least 7,500 cubic feet per minute.

The specific kiln design, dimensions, rate of rotation, pitch, etc. need not be identified as several modifications thereof in combination with modifications in the gas and ore temperatures and compositions will yield the same identical result. The entrant reducing gas temperature approximates 2000° F. and the ore temperature in the kiln approximates 1800° F.

Under these conditions the carbon dioxide content of the gas leaving the final reducer remains approximately constant. Therefore in any given time interval the total carbon dioxide content of the gas may be readily determined. The exact conditions that will be necessary in the regeneration of the gas may be readily calculated and the regenerating apparatus designed accordingly.

As above stated, it is contemplated to withdraw from the ore reducing system such a proportion of the reducing gas during any given unit of time which upon regenerating would yield as a result of the reduction or conversion of the carbon dioxide content to carbon monoxide, an increase in volume substantially equivalent to, that proportion of the reducing gas which is not withdrawn for regeneration, but which is allowed to continue through the preliminary reducing kiln 1 and thence dissipated to the atmosphere through the feed intake or carried away to be utilized for its available heat energy. The exact proportion to be withdrawn during any given time interval may be readily calculated when the carbon dioxide content of the effluent gas becomes a standardized and known quantity.

The gas purification or gas regeneration system of the present invention briefly comprises a carburetor or gas generator 4 in which means are provided to heat the coke to temperatures approximating 2700° F., means to pass the carbon dioxide containing gas over the heated coke until the coke temperature approximates 2400° F., means to cool the effluent regenerated gases to a predetermined temperature approximating 2000° F., and means to continuously return the gas at that temperature to the ore reducing system.

In order to obtain reduction of carbon dioxide ($CO_2$) to carbon monoxide (CO) it is necessary to contact the gas with the heated coke for definite time intervals at any given elevated temperature the specific time interval decreasing with increase in temperature. For example, at 2192° F. it requires 13 seconds of contact to obtain a 98% reduction of $CO_2$ to CO; at 2372° F. it requires only 4 seconds to obtain the same reduction and 9 seconds to obtain a 99.9% reduction. At higher temperature the time interval of contact required is materially shorter than 9 seconds. I have found for example, that when a coke temperature of between 2400° F. and 2700° F. is maintained that the time interval of contact is reduced to under eight seconds.

The big problem is to provide efficient and commercially practical means to maintain the coke in the carburetor at this relatively high temperature so that efficient gas purification or regeneration can be obtained. This difficulty is caused by the fact that the reduction of carbon dioxide to carbon monoxide is endothermic (heat absorbing) in nature and requires the addition of a relatively large amount of heat energy to carry to completion. Heretofore in the art it has been customary to supply this heat energy to the system by external heating means applied either to the gas or to the coke whereby the coke was continuously maintained at the desired reacting temperature and the contact interval of the gas therewith adjusted accordingly.

In the present invention I propose to supply this heat energy to the gas reducing system by an alternating cycle of operations wherein the coke in the carburetor or producer 4 is first oxidized by a blast of air to the desired maximum temperature and the gas from the producer is burnt in the stove or preheater 5. Then the carbon dioxide containing gases are passed through the stove 5, being raised in temperature therein and are then contacted with the carbon in the producer during the time interval required to lower the temperature of the coke to a desired minimum. The coke is then reheated by a blast of air to the desired maximum temperature and the carbon dioxide containing gas again passed through the coke until the temperature of the coke drops to the desired minimum temperature.

By a precise adjustment of time intervals, gas pressures and volumes, and a balancing of heat energies generated and lost, and by a proper design of equipment, it is possible to so balance the alternating air and gas blast operations that the heat energy supplied to the coke or derivable from the potential heat energy of the gases generated during the air blast is sufficient to sustain the carbon dioxide reducing reaction during the gas blast. By providing a plurality of the alternating generators and gas purifiers in staggered operation I may adjust the sequence of operations to obtain a substantially constant supply of effluent regenerated gas.

In the operation of a single generator and carburetor of the gas purification system, as illustrated in Fig. 1 the proportion of reducing gas that is withdrawn from the reducing system through conduit 8 by means 7 which may comprise a blower fan, is passed through a heat exchanger device of any convenient type wherein the heat energy is absorbed. A blast of air from source 10 which may also be a suitable blower fan is thereafter passed through the heat exchanger and the air preheated. The preheated air is carried by conduit 13 to pipe 14 where it is divided into two parts. One part flows into producer 4 and the other into a stove or preheater 5. The part passing through the producer 4 reacts with the incandesced coke contained therein to form ordinary producer gas and the heat energy of the reaction raises the temperature of the coke to approximately 2700° F. The producer gas thus formed passes out of the producer by conduit 15 where it is admixed in any suitable manner with the other part of the preheated air and burned. Means such as damper 16 are provided to adjust the pressures in the two parts to obtain the proper admixture of air and gas for combustion.

The heat energy derived from the burning of the air gas mixture is absorbed in the stove or preheater 5 and the cooled burned gases are expelled through stack 11. The gas producer or coke preheating system then is shut off by closing valves 17, 18, 19 and 20 and the gas regenerating or purifying system is opened by opening valves 21, 22, 23 and 24.

The blower fan 7 draws the gas from the reducing system through conduit 8 into the air preheater or heat exchanger 6, thence into the stove or gas preheater 5 through pipe 14 into the carburetor or producer 4, through the incandesced coke to conduit 9 and thence back into the final reducing kiln 2. The passage of the gas through the producer 4 continues until the temperature of the coke drops to approximately 2400° F. Valves 21 to 24 inclusive are then closed and valves 17 to 20 inclusive opened and the air blast cycle repeated.

With the gas of known carbon dioxide content the required heat energy to reduce the carbon dioxide to carbon monoxide may be readily determined and the apparatus designed accordingly to approximate the desired result. A finer control of the systems may then be obtained by means of thermostat or heat responsive elements 40 and 41 located in pipes 9 and 15, respectively, to control mechanism to automatically open and close the two sets of valves in the air and gas blast systems. It is desired, for example, to maintain the temperature of the effluent regenerated gas in conduit 9 at temperatures approximating but not in excess of 2000° F. The gas passing through the generator is heated to between 2400° F. and 2700° F. I provide means, however, such as by circulating the gas through the incoming coke feeding the generator to cool the gas to 2000° F. before it passes into pipe 9. A thermostat element adapted to energize suitable mechanism operating to close valves 21 to 24, inclusive, and to open valves 17 to 20, inclusive, in response to a limited variation from this temperature in the effluent producer gases, could be located in the pipe 9.

During the air blast the temperature of the effluent gases in the pipe 15 would be dependent upon the coke temperatures and when the coke temperature has reached the desired 2700° F. maximum a thermostat element adjusted to be responsive within this temperature range may be located in the conduit 15 and adapted to energize mechanism to close valves 17 to 20, inclusive, and to open valves 21 to 24, inclusive.

To obtain the continuous gas regeneration feature of the present invention a plurality of gas generator systems illustrated in Fig. 1 in staggered or alternately arranged relationship is employed. In Fig. 2 is shown in schematic detail two sets of alternating gas purification systems such as is illustrated in Fig. 1, designed and adjusted to synchronize the air blast and gas reducing cycles so that when one is on air the other is on gas and vice versa. In addition I have provided gas storage means 30 shown in dotted lines which may be utilized to store the regenerated gas or which may be utilized as a source of producer gas to be supplied through valve 31 to the ore reducing system in increments as needed to replace the reducing gases that may be inadvertently lost therefrom during the operation of the combined system. Means 30 may also be utilized to initiate the ore reducing and gas regenerating cycles, if desired.

The gas storage means are not essential to the successful application of the present invention as it is possible to run the air blast through the producer 4 until the coke is raised to such a temperature that when air is passed therethrough the temperature of the producer gas thus formed approximates 2000° F. This gas can then be circulated through the reducing system and withdrawn therefrom through pipe 8 in the reverse cycle to serve as a nucleus for the producer gas cycle. Within a short time an equilibrium would be established and the alternate cycles above disclosed would be standardized.

It is also apparent that whereas I have disclosed rotary kiln furnaces in the ore reducing system I may equally as well employ ore reducing furnaces of the stack type wherein the gases are to be withdrawn from the stack furnace at a predetermined desired point.

From the above disclosure and drawings it is apparent that many modifications and departures may be made from the specific embodiment disclosed herein without departing essentially from the nature and scope of the invention as may be set forth in the accompanying claims.

What I claim is:

1. In the reduction of iron ore to sponge iron by passing preheated carbon monoxide containing reducing gases thereover, the method of maintaining a strong free flow of preheated gas substantially free from carbon dioxide and at a determined temperature approximating 2000° Fahrenheit in a reducing chamber which comprises withdrawing a proportion of the spent reducing gas from the ore reducing chamber, directing said withdrawn gas through a heat exchanger and thence through a gas preheater, forcing the gas from said preheater into a carburetor and back into said reducing chamber, directing air through said heat exchanger and into said carburetor, directing air from said heat exchanger into said gas preheater, forcing gas from said carburetor into said gas preheater and burning the same when mixed with said preheated air, exhausting the products of said combustion, and repeating the cycle of withdrawing a proportion of the spent reducing gas from the ore reducing chamber, and directing it through said heat exchanger, said gas preheater, said carburetor and back into said reducing chamber.

2. In the reduction of iron ore to sponge iron by passing preheated carbon monoxide containing reducing gases thereover, the method of maintaining a strong free flow of said reducing gases preheated to a determined temperature through a reducing chamber which comprises withdrawing a portion of the reducing gases from the ore reducing chamber, utilizing the heat resulting from the combustion of producer gas and preheated air to preheat said withdrawn gases to a determined temperature dependent upon the carbon dioxide content thereof and then passing said preheated gases through carbonaceous fuel incandesced to temperatures ranging from 2400° F. to 2700° F., cooling said gas to temperatures approximating 2000° F. and then returning the gases to the reducing chamber without substantial loss in sensible heat therefrom.

3. In the reduction of iron ore to sponge iron by passing preheated carbon monoxide containing reducing gases thereover, the method of maintaining a strong free flow of preheated gas substantially free from carbon dioxide and at a determined temperature approximating 2000° F. in a reducing chamber which comprises withdrawing a proportion of the spent reducing gas from the ore reducing chamber, said proportion being dependent upon the carbon dioxide content thereof, utilizing the heat resulting from the combustion of producer gas and preheated air to preheat said withdrawn portion to a determined temperature dependent upon the carbon dioxide content of the gas, passing the preheated gas through carbonaceous fuel preheated to temperatures ranging from 2400° F. to 2700° F., cooling said gases to temperatures approximating 2000° F. and then returning the gases to the reducing chamber without substantial loss in sensible heat therefrom.

WILLIAM DARKE BROWN.